(12) United States Patent
Sangern et al.

(10) Patent No.: US 11,334,048 B2
(45) Date of Patent: May 17, 2022

(54) METHOD TO ENSURE SAFETY CRITICAL FUNCTIONALITY FOR AN ELECTRICALLY POWERED MACHINE

(71) Applicant: ROBERT BOSCH TOOL CORPORATION, Broadview, IL (US)

(72) Inventors: Rattapong Sangern, Bartlett, IL (US); Gregory A. Herman, Elk Grove Village, IL (US); Bradley Padget, Huntley, IL (US)

(73) Assignee: ROBERT BOSCH TOOL CORPORATION, Broadview, IL (US)

( * ) Notice: Subject to any disclaimer, the term of this patent is extended or adjusted under 35 U.S.C. 154(b) by 308 days.

(21) Appl. No.: 16/646,292

(22) PCT Filed: Sep. 18, 2017

(86) PCT No.: PCT/US2017/052058
§ 371 (c)(1),
(2) Date: Mar. 11, 2020

(87) PCT Pub. No.: WO2019/055049
PCT Pub. Date: Mar. 21, 2019

(65) Prior Publication Data
US 2021/0034033 A1 Feb. 4, 2021

(51) Int. Cl.
*G05B 19/406* (2006.01)
(52) U.S. Cl.
CPC .. *G05B 19/406* (2013.01); *G05B 2219/50193* (2013.01)
(58) Field of Classification Search
None
See application file for complete search history.

(56) References Cited

U.S. PATENT DOCUMENTS

| 5,508,490 | A | 4/1996 | Klose | |
|---|---|---|---|---|
| 2002/0020262 | A1* | 2/2002 | Gass | B27B 5/38 |
| | | | | 83/DIG. 1 |

(Continued)

FOREIGN PATENT DOCUMENTS

| DE | 112014006106 T5 | 9/2016 |
|---|---|---|
| EP | 2685334 A2 | 1/2014 |
| JP | S6314486 A | 1/1988 |

OTHER PUBLICATIONS

International Search Report for PCT/US2017/052058, dated May 29, 2018.

(Continued)

*Primary Examiner* — Kenneth M Lo
*Assistant Examiner* — Istiaque Ahmed
(74) *Attorney, Agent, or Firm* — Norton Rose Fulbright US LLP; Gerard Messina

(57) ABSTRACT

A method for ensuring safety critical functionality for a laser engraver includes obtaining a command from a laser motor controller; obtaining sensor data from a plurality of sensors, the sensor data corresponding to an operating status of various components of the laser engraver; determining a functioning status for each component; and as a result of determining the functioning status for all of the components, enabling supply of power to a laser, where the method is performed by a safety controller that is embodied in hardware completely separate from hardware in which the laser motor controller is embodied. One example required functioning status is that a power button has been selected twice in quick succession.

18 Claims, 3 Drawing Sheets

(56) References Cited

U.S. PATENT DOCUMENTS

| | | | |
|---|---|---|---|
| 2007/0168077 A1* | 7/2007 | Schuster | G05B 19/4061 |
| | | | 700/170 |
| 2011/0284511 A1* | 11/2011 | Boynton | B23K 26/26 |
| | | | 219/121.72 |
| 2014/0018958 A1* | 1/2014 | Ueno | B25J 9/1674 |
| | | | 700/255 |
| 2017/0235294 A1 | 8/2017 | Shapiro | |

OTHER PUBLICATIONS

Omron: "Technical Explanation for Safety Components", Jul. 6, 2017, XP055478778, Retrieved from the Internet: URL:https://web.arhive.org/web/20170706143544/http://www.ia.omron.com/data_pdf/guide/4/safetycomp_tg_e_1_1.pdf. 20 pages.

* cited by examiner

METHOD TO ENSURE SAFETY CRITICAL FUNCTIONALITY FOR AN ELECTRICALLY POWERED MACHINE

FIELD OF THE INVENTION

The present invention relates generally to methods of ensuring safety critical functionality for a powered tool or machine, such as a laser engraver.

BACKGROUND

A laser engraver is a device that utilizes a high-voltage power supply and a laser to perform various functions on various materials. The laser of the laser engraver may be operated, for example, to cut, etch, bleach, cure, and/or burn the material. The laser engraving process includes performing these various functions on a selected material and is controlled by digital files that provide the specifications that describe how to perform the various functions. The digital files specifying the design are provided by the user and transmitted to the laser engraver, which translates the digital files into control commands for various components of the laser engraver.

Many laser engravers are protected from external influences by a build cage. The interior of the build cage can be accessed through a lid and/or opening. The laser engraver typically includes a laser power source; within the build cage, at least one laser, a build platform, and a guide rail system; and at least one motor for maneuvering the at least one laser.

SUMMARY

Example embodiments of the present invention provide methods and systems to ensure safety critical functionality for a laser engraver.

Due to inherent dangers involved with burning and cutting materials, laser engravers pose significant safety hazards for users. For example, when operating the laser, the laser engraver may cause a fire to start on the material, and/or, when the laser is in operation, the engraving process may result in toxic fumes or smoking being produced as a result of burning and/or cutting the material. Additionally, due to the voltage requirement of a laser of a laser engraver, relatively high voltage is supplied to the laser via a laser power source. Supplying voltage at this level creates a risk of voltage arcs occurring, which can cause serious injury to a user, besides for damage to the laser engraver itself.

It is desirable, therefore, to ensure that all safety components of a laser engraving device are functioning properly before activating the laser. To make this determination and to monitor the safety components during operation of the laser, it is advantageous to isolate the hardware and/or software that are performing the safety analysis from the rest of the laser engraver. Advantages of isolation and separation of the safety analysis and function monitoring from the laser control software (i.e., laser motor control, input/output controls, etc.) include, for example, that any software updates to the laser control software would not result in changes to the isolated safety analysis software, which may compromise the integrity of the safety functionality. Moreover, the development of the safety analysis software can be accomplished in a focused manner to ensure and verify design intent of safety critical functionality. Furthermore, the hardware and software performing the safety analysis can be reviewed for certification (e.g., UL certification) without requiring review of the hardware and software that do not perform safety analyses.

Thus, according to the present invention, a controller that controls the laser is a hardware component that is programmed by hardwired programming and/or with software according to which the controller operates the laser according to instructions received, for example, from a user operating a computer, where an entirely separate safety controller formed of hardware or a combination of hardware and software, whose hardware or, if formed additionally with software, whose hardware and software is completely separate from the hardware/software of the controller that controls the laser and from any other hardware/software of the laser engraver. For example, in an example embodiment, the safety controller is embodied in a different chip and/or circuit board than that of the laser controller with a different memory device than that used by or forming part of the laser controller. In an example, the safety controller receives a signal from the laser controlling controller indicating that a job is ready to be performed by control of the laser and receives signals from sensors and/or a power button indicating that all safety conditions (e.g., that a lid is closed) are met for the laser job to be executed. In response to the job ready signal in combination with the determination that all of the safety conditions are met, the safety controller outputs an enable signal that triggers a power source to power the laser with sufficient power to perform the job under control of the laser controller. The laser controller is able to control the laser to perform the job only when the laser is provided sufficient power under control of the safety controller.

According to an example embodiment of the present invention, a safety critical microcontroller comprises a processor configured to: obtain a command from a laser motor controller; obtain sensor data from each of one or more sensors, the sensor data of each of the respective sensors corresponding to an operating status of a respective component of a laser engraver device; determine, based on the sensor data, a status for each of the respective components of the laser engraver device; and based on the determined status(es) for all of the one or more sensors, transmit a power-on command to a laser power switch, the power-on command configured to initiate a flow of power from a power source to a laser. A non-exhaustive list of examples of the components for which the sensor data is obtained and on the basis of which the command is issued includes a fan, an air source a water source, a lid, a start button, and a laser power source. The power button can be a hardware component or a soft key, e.g., of a touchscreen display device.

In an example embodiment, the processor of the safety critical microcontroller is configured to, as a result of obtaining the command from the laser motor controller, monitor for a confirmation signal indicating that a start button of the laser engraver has been activated two times in succession, e.g., in quick succession, as a double click. Requiring a double click of the button helps ensure that the engraver is not started by mistake in an unsafe manner or condition. In an example embodiment, the laser engraver is configured to display an instruction to double click the start button on a display device of the laser engraver.

In an example, a single click or press of the start button does not trigger performance of any function on its own, but rather only with the double click or press is the laser able to be triggered to operate.

In an example embodiment, the laser has a single source of power, and a supply of power from the single source of power to the laser is controlled only by the safety critical microcontroller. In another example embodiment, the laser includes a first power source for powering components of the laser engraver not involving the firing of the laser beam and a second dedicated power source used for powering the laser beam, where the safety critical microcontroller is powered by the first power source and controls the turning on of the second power source (and/or the connection of the second power source to the laser beam generating component(s)).

In an example embodiment, the safety critical microcontroller is physically and operationally separate and distinct from all other components of the laser engraver so that the safety critical microcontroller is capable of operating independent from all other components of the laser engraver.

In an example embodiment, the processor is further configured to transmit the status of each of the monitored components of the laser engraver to a display device for display.

In an example embodiment, the processor is configured to determine that the laser of the laser engraver is activated; as a result of determining that the laser is activated, obtain fault data from the plurality of sensors, the fault data corresponding to a sensor malfunction; and as a result of obtaining fault data, deactivate the powering of the laser source.

According to an example embodiment of the present invention, a laser engraver device includes: a sensor, e.g., a plurality of sensors, for sensing an operating status of a respective component of a laser engraver device; at least one laser; a laser motor controller for controlling the at least one laser; a laser power source that includes a laser power switch, where the laser power source is configured to supply power to the laser; a safety critical microcontroller; and a power source for supplying power to the laser power source, the laser motor controller, and the safety critical microcontroller. In an example embodiment, the safety critical microcontroller is configured to obtain a command from the laser motor controller; obtain the operating status(es) of the respective components; determine, based on the operating status(es), a functioning status for each of the respective components of the laser engraver device; and as a result of determining the functioning status(es) for all of the plurality of sensors, transmit a power-on command to the laser power switch, the power-on command configured to initiate a flow of power from the power source to a laser.

These and other features, aspects, and advantages of the present invention are described in the following detailed description in connection with certain exemplary embodiments and in view of the accompanying drawings, throughout which like characters represent like parts. However, the detailed description and the appended drawings describe and illustrate only particular example embodiments of the invention and are therefore not to be considered limiting of its scope, for the invention may encompass other equally effective embodiments.

DETAILED DESCRIPTION

Figure 1:
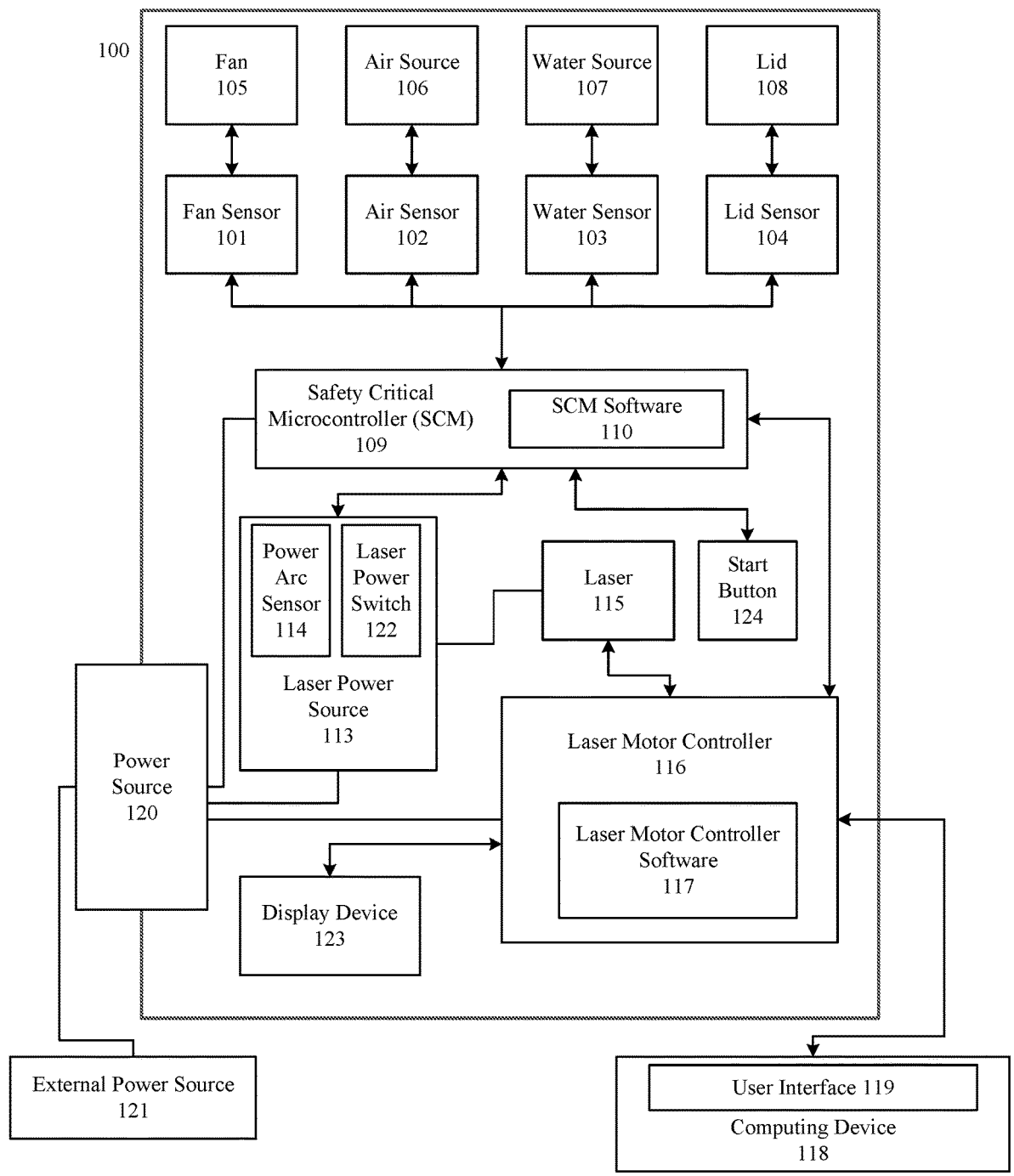
FIG. 1 is a schematic illustration of a laser engraver according to an example embodiment of the present invention.

FIG. 1 shows a laser engraver 100. In an example embodiment, laser engraver 100 includes various sensors. For example, in an example embodiment, the laser engraver 100 includes a fan sensor 101 configured to sense the operational status of a fan 105; an air sensor 102 configured to sense the operational status of an air source 106; a water sensor 103 configured to sense the operational status of a water source 107; and a lid sensor 104 configured to sense the position of lid 108 (e.g., if the lid is opened or closed). Laser engraver 100 can include various other sensors to monitor other components. Sensors 101-104 are connected to a safety critical microcontroller (SCM) 109 so that SCM 109 can transmit/receive sensor data to/from sensors 101-104. SCM 109 can also transmit/receive sensor data to/from a start button 124 and a laser power source 113. In an example, start button 124 is configured to be pressed/activated by a user to initiate operation of the laser. SCM 109 can be connected to the above mentioned components via wired connection or via a wireless connection. SCM 109 includes SCM software 110 that controls the operation of SCM 109. In an alternative example embodiment, the SCM is programmed with a hardwired program instead of with software or in addition to software.

Laser engraver 100 includes laser motor controller 116, e.g., including laser motor controller software 117. Laser motor controller software 117 controls laser motor controller 116 and is capable of transmitting and/or receiving data to/from a computing device 118. Laser motor controller 116 is connected to a laser 115 and SCM 109 and is capable of controlling laser 115. Laser motor controller 116 is connected to SCM 109 so that information can be transferred between laser motor control 116 and SCM 109. Laser motor controller 116 can be connected to the above mentioned components via a wired or wireless connection. Computing device 118 can include a user interface 119 through which a user can input data. Laser motor controller 116 can be connected to an additional display device 123 of laser engraver 100.

Display device 123 can be, for example, a touch screen interface that allows users to easily interact with the laser engraver. The touch screen interface can include a touch sensor panel, which can be a clear panel with a touch-sensitive surface, a display device that can be positioned behind the panel so that the touch-sensitive surface substantially covers the viewable area of the display device, and a computer processor to interpret signals from the touch-sensitive surface. The touch screen interface allows a user to provide various types of input to the laser engraving by touching the touch sensor panel using a finger, stylus, or other object at a location dictated by a user interface being displayed by a display device. This interaction can include, for example, inputting commands, adjusting settings, viewing information, etc. In general, the touch screen interface can recognize a touch event (i.e., user interaction) and the position of the touch event on the touch sensor panel, can then interpret the touch event in accordance with the display appearing at the time of the touch event, and thereafter can perform one or more actions based on the touch event.

SCM 109 is configured as a microcontroller that is physically separate and distinct from both laser motor controller 116 and laser motor controller software 117. SCM software 110 is configured to be physically separate and distinct from both laser motor controller 116 and laser motor controller software 117. That is, SCM software 110 is capable of controlling SCM 109 without, and is stored in a physically separate storage location than, laser motor controller 116 and laser motor controller software 117.

Laser engraver 100 can include a power source 120 connected to an external power source 121 for operating laser engraver 100. Power source 120 can be connected to and provide power to laser power source 113; laser motor controller 116; and SCM 109. Laser engraver 100 can be configured so that when power is supplied to power source 120, power is automatically supplied to SCM 109 and laser motor controller 116, with SCM 109 being configured to control when power is supplied from power source 120 to laser power source 113.

In an alternative example embodiment, laser engraver 100 is also configured so that when power is supplied to power source 120, power is also automatically supplied to laser power source 113, with SCM 109 controlling when power is supplied by the powered laser power source 113 to the laser 115. For example, in an example embodiment, laser power source 113 is connected to laser 115 through a laser power switch 122 so that laser power source 113 provides power to laser 115 via laser power switch 122. Laser power switch 122 can include, for example, an enable pin that permits the flow of power from laser power source 113 to laser 115. Laser power source 113, for example, can be configured to provide electrical energy at a relatively high voltage to laser 115. For example, laser power source 113 can provide electrical energy in the range of about 20,000 to 30,000 volts.

In an example embodiment, laser power source 113 includes power arc sensor 114 capable of detecting an electrical arc within laser engraver 100 for determination of whether unsafe arcs are present, and laser power switch 122 capable of controlling the flow of power from laser power source 113 to laser 115. In one particular embodiment, laser 115 can only receive power via laser power switch 122.

SCM 109 is connected to laser power source 113 for data transfer between SCM 109 and power arc sensor 114 and so that SCM 109 can control laser power switch 122 and, therefore, the flow of power from laser power source 113 to laser 115.

Figure 2:
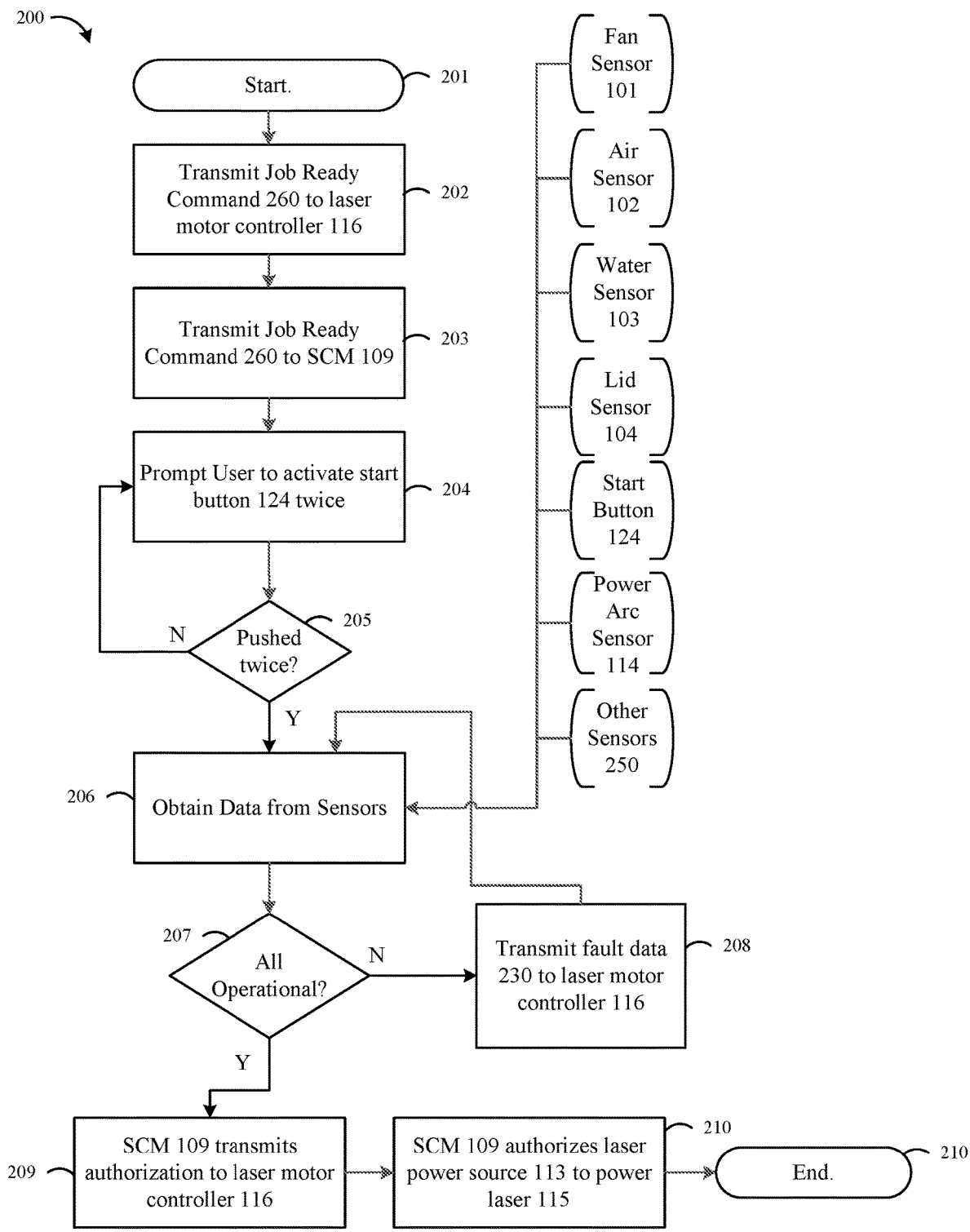
FIG. 2 is a flowchart of a method of ensuring safety critical functionality for a laser engraver according to an example embodiment of the present invention.

FIG. 2 is a flowchart that illustrates a method 200 for ensuring safety critical functionality for a laser engraver according to an example embodiment of the present invention. Method 200 beings at step 201.

At step 202, Job Ready Command 260 is transmitted to laser motor controller 116. Job Ready Command 260 can be transmitted, for example, from computing device 118 to laser motor controller 116. At step 202, Job Ready Command 260 is transmitted from laser motor controller 116 to SCM 109. (It is noted that the content of the command from computing device 118 to laser motor controller 116 can differ from the content of the command from laser motor controller 116 to SCM 109.)

When SCM 109 receives Job Ready Command 260, SCM 109, at step 204 prompts a user to activate start button 124 twice. (Alternatively, SCM 109 does not prompt the user to perform this action, but rather merely waits for a signal indicating that the action has been performed.) At step 205, method 200 verifies that start button 124 has been activated twice. If start button 124 has not been activated twice, method 200 returns to step 204 and prompts user to activate start button 124 twice. (Alternatively, SCM 109 does not issue such a prompt but rather loops back to waiting for an indication that the button has been pressed twice.) In this manner, a safety check can be performed via start button 124 to prevent laser 115 from being activated inadvertently if start button is malfunctioning or if a user inadvertently presses the start button. For example, if start button 124 was left in an "ON" position from the last time laser 115 was activated, laser 115 might activate inadvertently during a subsequent operation of laser 115. Similarly, if start button 124 is malfunctioning and cannot be deactivated, laser 115 might be activated inadvertently during operation of laser 115. Requiring that start button 124 be activated twice in succession can be a safety check that is performed before activating laser 115. In one particular embodiment, the laser engraver 100 requires the time between successive activations of start button 124 not to exceed a predefined time period in the range of about 1 to 10 seconds, preferably in the range of about 1 to 5 seconds.

If start button has been pushed twice, method 300 continues to step 206 and begins obtaining data from sensors 101-104, power arc sensor, and any other sensors 250 that are monitoring laser engraver 100.

In response to obtaining data from sensors 101-104, 114, and 250, method 200 determines if all systems corresponding to data received from the sensors are operational and functioning properly and in a safe condition. If all systems are not operational and functioning properly and in a safe condition, method 300 proceeds to step 208 and transmits fault data 230 corresponding to faults of system components that are not operational and/or not functioning properly and/or in a safe condition. Fault data 230 can be transmitted to laser motor controller 116 and displayed to a user via display device 123 and/or user interface 119. Fault data 230 can be presented to a user so that nonfunctioning components of laser engraver can be fixed.

If all systems are operational and functioning properly, then in step 209, SCM 109 transmits authorization to laser motor controller 116 indicating that all systems are operational and ready for operation. At step 210, SCM 109 authorizes or triggers laser power source 113 to provide power to laser 115. Method 200 ends at step 210.

Figure 3:
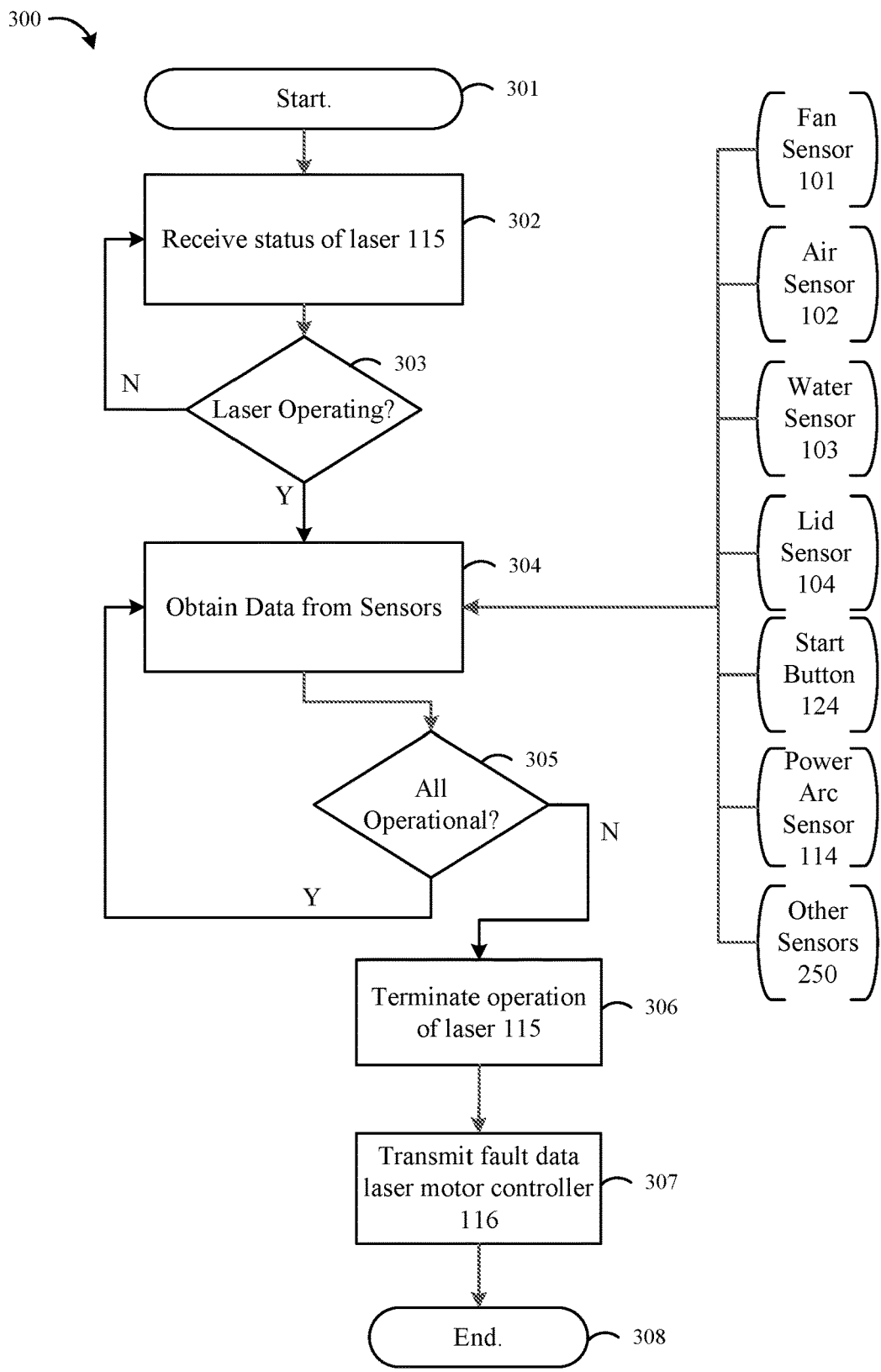
FIG. 3 is a flowchart of a method of ensuring safety critical functionality for a laser engraver according to another example embodiment of the present invention.

FIG. 3 is a flowchart that illustrates a method 300 for ensuring safety critical functionality for a laser engraver according to an example embodiment of the present invention. Method 300 begins at step 301.

At step 302, information relating to the status of laser 115 is received. In response to receiving the status of laser 115, method 300 determines the operating status of laser 115 at step 303. If laser 115 is not operating, method 300 returns to step 302. If laser 115 is operating, method 300 continues to step 304 and begins receiving data from sensors 101-104, start button 124, power arc sensor 114, and any other sensors 250 that are monitoring laser engraver 100 and on the basis of which SCM 109 controls laser power source 113.

In response to receiving data from sensors 101-104, 114, and 250, method 300 determines if all systems and/or components corresponding to the data received from the sensors are operational and functioning properly and in a safe condition. If all systems are operational and functioning properly, method 300 returns to step 304 and continues to monitor the data received from sensors 101-104, 114, and 250.

If all systems are not operational and functioning properly and in a safe condition, method 300 proceeds to step 306 terminates the operation of laser 115. Terminating the operation of laser 115 may be accomplished by SCM 109 shutting off power to laser 115 via laser power switch 122.

At step 307, fault data 230 can be transmitted to laser motor controller 116 and displayed to a user via display device 123. Method 300 ends at step 208.

An example embodiment of the present invention is directed to processing circuitry, e.g., including one or more processors, which may be implemented using any conventional processing circuit and device or combination thereof, e.g., a Central Processing Unit (CPU) of a Personal Computer (PC) or other workstation processor, to execute code provided, e.g., on a non-transitory computer-readable medium including any conventional memory device, to perform any of the methods described herein, alone or in combination. The one or more processors can be embodied in a server or user terminal or combination thereof. The user terminal can be embodied, for example, as a desktop, laptop, hand-held device, Personal Digital Assistant (PDA), television set-top Internet appliance, mobile telephone, smart phone, etc., or as a combination of one or more thereof. The memory device can include any conventional permanent and/or temporary memory circuits or combination thereof, a non-exhaustive list of which includes Random Access Memory (RAM), Read Only Memory (ROM), Compact Disks (CD), Digital Versatile Disk (DVD), and magnetic tape.

An example embodiment of the present invention is directed to one or more non-transitory computer-readable media, e.g., as described above, on which are stored instructions that are executable by a processor and that, when executed by the processor, perform the various methods described herein, each alone or in combination or sub-steps thereof in isolation or in other combinations.

An example embodiment of the present invention is directed to a method, e.g., of a hardware component or machine, of transmitting instructions executable by a processor to perform the various methods described herein, each alone or in combination or sub-steps thereof in isolation or in other combinations.

The above description is intended to be illustrative, and not restrictive. Those skilled in the art can appreciate from the foregoing description that the present invention can be implemented in a variety of forms, and that the various embodiments can be implemented alone or in combination. Therefore, while the embodiments of the present invention have been described in connection with particular examples thereof, the true scope of the embodiments and/or methods of the present invention should not be so limited since other modifications will become apparent to the skilled practitioner upon a study of the drawings, specification, and following claims.

What is claimed is:

1. A safety critical microcontroller for a laser engraver device, the microcontroller comprising:
   a processor configured to:
   obtain a command from a laser motor controller;
   obtain sensor data from one or more sensors, the sensor data of each of the one or more sensors corresponding to an operating status of a respective component of a laser engraver device;
   with respect to each of the one or more sensors, determine, based on the respective sensor data, a functioning status for the component of the laser engraver device to which the respective sensor corresponds; and
   based on the determined functioning status for all of the one or more sensors, transmit a power-on command to a laser power switch to initiate a flow of power from a power source to a laser, wherein maneuvers of the laser for performing a laser job are controlled by the laser motor controller all of whose hardware is separate from all of the hardware of the safety critical microcontroller;
   as a result of obtaining the command from the laser motor controller, transmit a request for a start button of the laser engraver to be activated two times in succession, wherein the request is displayed to a user on a display device of the laser engraver; and
   receive from the start button a confirmation signal indicating that the start button has been activated two times in succession.

2. The safety critical microcontroller of claim 1, wherein the one or more components include one or more of a fan component; an air source; a water source; a lid; a start button; and a laser power source.

3. The safety critical microcontroller of claim 1, wherein the processor is further configured to transmit the functioning status of each of the one or more components of the laser engraver to a display device for display.

4. The safety critical microcontroller of claim 1, wherein the transmission of the power-on command occurs conditional upon receipt of the confirmation signal from the start button.

5. The safety critical microcontroller of claim 1, wherein a supply of power from the power source to the laser is enabled only with the initiation by the safety critical microcontroller.

6. The safety critical microcontroller of claim 1, wherein the safety critical microcontroller is physically and operationally separate and distinct from all other components of the laser engraver.

7. The safety critical microcontroller of claim 1, wherein the processor is further configured to:
   determine that the laser of the laser engraver is activated;
   as a result of the determination that the laser is activated, obtain fault data from the plurality of sensors, the fault data corresponding to a sensor malfunction safety critical microcontroller; and
   as a result of obtaining fault data, deactivate the laser by disabling delivery of power from the power source to the laser.

8. A laser engraver device, comprising:
   one or more sensors, each configured to sense an operating status of a respective component of the laser engraver device;
   a laser;
   a laser motor controller for controlling maneuvers of the laser for performing a job;
   a first power source that includes a laser power switch and that is configured to supply power to the laser depending on a state of the switch;
   a safety critical microcontroller; and
   a second power source for supplying power to the first power source, the laser motor controller, and the safety critical microcontroller;
   wherein:
   all hardware of the laser motor controller is separate from all of hardware of the safety critical microcontroller; and
   the safety critical microcontroller is configured to:
   obtain a command from the laser motor controller;
   for each of the one or more sensors:
   obtain the operating status of the respective component to which the respective sensor corresponds; and
   determine whether the respective operating status satisfies a predefined condition; and
   responsive to the determination for all of the one or more sensors being that the respective operating status satisfies the predefined condition, transmit a power-on command to the laser power switch to initiate flow of power from the first power source to the laser;

as a result of obtaining the command from the laser motor controller, transmit a request for a start button of the laser engraver to be activated two times in succession, wherein the request is displayed to a user on a display device of the laser engraver; and receive from the start button a confirmation signal indicating that the start button has been activated two times in succession.

9. The laser engraver device of claim 8, wherein the one or more components include one or more of a fan component; an air source; a water source; a lid; a start button; and a laser power source.

10. The laser engraver device of claim 9, wherein the one or more sensors include:

a fan sensor, the fan sensor configured to detect the status of the fan component;

an air source sensor, the air source sensor configured to detect the status of the air source; and a water source sensor, the water source sensor configured to detect the status of the water source.

11. The laser engraver device claim 8, wherein the safety critical microcontroller is further configured to transmit the functioning status of each of the one or more components of the laser engraver to a display device for display.

12. The laser engraver device claim 8, wherein the transmission of the power-on command occurs conditional upon receipt of the confirmation signal from the start button.

13. The laser engraver device of claim 8, wherein a supply of power from the first power source to the laser is enabled only by the safety critical microcontroller.

14. The laser engraver device of claim 8, wherein the safety critical microcontroller is physically and operationally separate and distinct from all other components of the laser engraver.

15. The laser engraver device of claim 8, the safety critical microcontroller is further configured to:

determine that the laser of the laser engraver is activated;

as a result of the determination that the laser is activated, obtain fault data from the plurality of sensors, the fault data corresponding to a sensor malfunction safety critical microcontroller; and as a result of obtaining fault data, deactivate the laser by disabling delivery of power from the first power source to the laser.

16. The laser engraver device of claim 8, wherein the one or more sensors include a power arc sensor, the power arc sensor configured to detect an electrical arc within the laser engraver device.

17. The laser engraver device of claim 16, wherein the transmission of the power-on command occurs conditional upon receipt of fault data from the power arc sensor, the fault data of the power arc sensor corresponding to the detection of the electrical arc within the laser engraver device.

18. The laser engraver device of claim 8, wherein the first power source is configured to provide electrical energy to the laser in the range of 20,000 to 30,000 volts.

* * * * *